United States Patent
Whitman et al.

(10) Patent No.: US 8,843,825 B1
(45) Date of Patent: Sep. 23, 2014

(54) MEDIA SHARING AND DISPLAY SYSTEM WITH PERSISTENT DISPLAY

(75) Inventors: Deborah L. Whitman, Palo Alto, CA (US); Stephen J. Ogden, Belmont, CA (US)

(73) Assignee: Photo Mambo Inc., Palo Alto, CA (US)

( * ) Notice: Subject to any disclaimer, the term of this patent is extended or adjusted under 35 U.S.C. 154(b) by 110 days.

(21) Appl. No.: 13/560,563

(22) Filed: Jul. 27, 2012

Related U.S. Application Data

(60) Provisional application No. 61/513,463, filed on Jul. 29, 2011.

(51) Int. Cl.
*G06F 3/048* (2013.01)
*G06F 17/30* (2006.01)

(52) U.S. Cl.
CPC .... *G06F 17/30056* (2013.01); *G06F 17/30716* (2013.01)
USPC ............................. 715/730; 715/764; 715/783

(58) Field of Classification Search
CPC ..................... G06F 17/30056; G06F 17/30716
USPC .......................................... 715/730, 764, 783
See application file for complete search history.

(56) References Cited

U.S. PATENT DOCUMENTS

| | | | |
|---|---|---|---|
| 6,442,573 B1 | 8/2002 | Schiller et al. | |
| 7,263,382 B2 | 8/2007 | Chandhok et al. | |
| 7,610,331 B1 | 10/2009 | Genske et al. | |
| 7,669,127 B2 * | 2/2010 | Hull et al. ..................... 715/716 |
| 7,711,578 B2 | 5/2010 | Williams et al. | |
| 7,724,281 B2 | 5/2010 | Vale et al. | |
| 7,734,700 B2 | 6/2010 | Johns et al. | |
| 7,792,708 B2 | 9/2010 | Alva | |
| 7,954,056 B2 * | 5/2011 | Graham ........................ 715/716 |
| 8,015,253 B1 | 9/2011 | Zapata et al. | |
| 8,069,212 B2 | 11/2011 | Johns et al. | |
| 8,099,502 B2 | 1/2012 | Genske et al. | |
| 8,200,504 B2 | 6/2012 | Williams et al. | |
| 8,212,893 B2 | 7/2012 | Bodnar et al. | |
| 8,385,964 B2 | 2/2013 | Haney | |
| 8,458,335 B2 | 6/2013 | Holzer | |
| 8,515,255 B2 | 8/2013 | Walker et al. | |
| 8,538,458 B2 | 9/2013 | Haney | |
| 8,543,721 B2 | 9/2013 | White et al. | |
| 8,595,764 B2 * | 11/2013 | Kikinis et al. .................. 725/37 |
| 8,597,119 B2 * | 12/2013 | Kelly et al. ...................... 463/31 |
| 8,610,830 B2 * | 12/2013 | Corlett et al. ................. 348/583 |
| 8,613,650 B2 * | 12/2013 | Kovacs et al. ................... 463/16 |

(Continued)

OTHER PUBLICATIONS

Ceiva, "PicturePlan® Photo Delivery Service," <http://www.ceiva.com/lmore/pp/pictureplan.jsp, Accessed Mar. 12, 2014, 1 page.

(Continued)

*Primary Examiner* — David Phantana Angkool
(74) *Attorney, Agent, or Firm* — Blakely, Sokoloff, Taylor & Zafman LLP

(57) ABSTRACT

A media sharing and display application and system comprising a method of sharing and persistently displaying photographs and short video clips, shared between close friends and family members or any group of people is described. The system, in one embodiment, is composed of desktop software, mobile device applications, an integrated server-based online service, and a website where online services are accessed. The system creates a user experience for both sharing and persistently displaying digital photos and videos on another person's computer or mobile device.

20 Claims, 21 Drawing Sheets

(56) References Cited

U.S. PATENT DOCUMENTS

| | | | | |
|---|---|---|---|---|
| 8,619,100 | B2* | 12/2013 | Capela et al. | 345/660 |
| 8,621,391 | B2* | 12/2013 | Leffert et al. | 715/823 |
| 8,625,625 | B2* | 1/2014 | Anderson et al. | 370/419 |
| 2010/0036967 | A1 | 2/2010 | Caine et al. | |
| 2010/0241962 | A1* | 9/2010 | Peterson et al. | 715/720 |

OTHER PUBLICATIONS

ConsumerReports.org, "Digital Picture Frame Buying Guide," <http://www.consumerreports.org/cro/digital-picture-frames/buying-guide.htm#connections>, Sep. 2012, 1 page.

Familiar, "Introducing the 21st Centry Photo Frame," <http://familiar.com/welcome/more_about_familiar>, Accessed Mar. 12, 2014, 2 pages.

Familiar, "Fact Sheet," <http://familiar.com/files/familiar_fact_sheet.docx>, Accessed Mar. 12, 2014, 2 pages.

Google, frame channel, <https://www.google.com/search?q=frame+channel&oq=frame+channel&aqs=chrome..69i57j0l5.2607j0j9&sourceid=chrome&espv=_210&es_sm=122& ie=UTF-8>, Accessed Mar. 12, 2014, 2 pages.

GPhotoFrame, Photo Frame Gadget, <https://code.google.com/p/gphotoframe/>, Accessed Mar. 12, 2014, 3 pages.

iCloud, "iCloud Photo Sharing," <https://www.apple.com/icloud/icloud-photo-sharing.html>, Accessed Mar. 12, 2014, 4 pages.

Instagram, Video, # Instagram News, Instagram Direct, <http://blog.instagram.com/post/69789416311/instagram-direct>, Accessed Mar. 12, 2014, 3 pages.

Kodak EZShare Digital Picture Frame User Manual <http://resources.kodak.com/support/pdf/en/manuals/urg00722/Digital_Frames_UG_GLB_en.pdf>, Accessed Mar. 12, 2014, 53 pages.

Looqs Mee Frame <http://www.looqs.com/meeframe_overview.php>, Accessed Mar. 12, 2014, 3 pages.

Nixplay, Display it Your Way <https://www.nixplay.com/#overview>, Accessed Mar. 12, 2014, 5 pages.

Perez, Sarah, "With $1.3M in Funding, Private Photo-Sharing Service Familiar Replaces Screensavers & Digital Picture Frames," <http://techcrunch.com/2012/09/18/with-1-3m-in-funding-private-photo-sharing-service-familiar-replaces-screensavers-digital-picture-frames/>, Sep. 18, 2012, 3 pages.

Santos, Elena, "Nice, original photo frame for your desktop," <http://free-photo-frame.en.softonic.com/>, Accessed Mar. 12, 2014, 1 page.

Team Whiskey Beavers, "Picmatic—Digital Photo Frame + Music Control + Clock," <https://itunes.apple.com/au/app/picmatic/id591781807?mt=8>, Accessed Mar. 12, 2014, 2 pages.

Webster, Scott, <http://reviews.cnet.com/8301-19736_7-57611984-251/make-your-android-tablet-a-socially-connected-photo-frame/>, Nov. 13, 2013, 5 pages.

Wingfield, Nick, "A Boost for an App That Replaces Digital Picture Frames," <http://bits.blogs.nytimes.com/2012/09/18/a-boost-for-an-app-that-replaces-digital-picture-frames/?_php=true&_type=blogs&_r=0>, Sep. 18, 2012, 2 pages.

Flickr, Help/FAQ/Sharing, <https://www.flickr.com/help/sharing/#2182>, Accessed Mar. 17, 2014, 5 pages.

Facebook, <https://www.facebook.com/help/459934584025324>, Accessed Mar. 17, 2014, 1 page.

Shutterfly, <https://sharecentral.shutterfly.com/helptopicsfaqs#n_108>, Accessed Mar. 17, 2014, 6 pages.

* cited by examiner

| Controls While Seeing Slideshow | Display |
|---|---|
| None | Display in default order, media packets in order of receipt |
| Control Next/Previous Image | Enable user to move forward/backward in slide show |
| Pause | Pause slideshow, until restart signal is received |
| Request for Newest Media | Restart slide-show at beginning, with newest media |
| Delete current photo/video from slide show | Remove from slideshow, but keep full-size image on drive |
| Screen saver mode (may be no user input to computer for period) | Enable screen saver mode, until signal received to move out of screen saver mode |
| Change default display order | Enable alternative slideshow display routine/media ordering |
| Close slideshow | Close application, saving state to restart per user preferences |

Figure 4

| Settings | Result |
|---|---|
| Change frame design | Enable user to select from available downloaded frames, or download additional frames. |
| Alter idle time before screen saver | Enable user to set new idle time |
| Change speed of slideshow | Enable user to adjust pause between changes |
| Change fade-over between images | Select format(s) to be used between image changes |
| Change number of media items in slideshow | Enable user to set a maximum number of images in the slideshow |
| Manually re-order the media items | Enable user to manually alter ordering |
| Set ordering preferences for media items | Set user preferences for ordering by media item, sender, image label, subject of the media item, date on the media item, or other metadata factors |
| Add new media from own collection | Enable selection of new media, from own collection, and add into the slideshow |

Figure 8

MEDIA SHARING AND DISPLAY SYSTEM WITH PERSISTENT DISPLAY

RELATED APPLICATIONS

The present application is related to, and claims priority to U.S. Provisional Patent Application Ser. No. 61/513,463, filed on Jul. 29, 2011. That application is incorporated by reference in its entirety.

FIELD

The present application is related to media sharing and display.

BACKGROUND

One prior art method of sharing photographs and other media with friends and family is by emailing them. However, media files are large, and this can become difficult, particularly when the sender wishes to share many images or video clips. Furthermore, if people wish to retain the photographs or media they receive to enjoy it later, they must download the individual files and incorporate them into a display solution, such as a digital picture frame, which can be tedious.

Another prior art method of sharing photographs and other media is to make them available via photo sharing services such as FLICKR™, INSTAGRAM™, or FACEBOOK™. However, this requires that the recipient visit the site in order to view the photos, and does not automatically provide the recipient with copies of the media for later viewing.

Another prior art method of sharing photographs or other media is a stand-alone digital picture frame. A memory card or USB memory device filled with images is inserted into the frame and the media on that memory device is displayed. People rarely take the time to update the media and a common phenomenon is to see such frames displaying pictures that are several years old. In addition, when a new memory card is created to update the frame, the previous card is removed and its contents are no longer available for display. This is particularly challenging if different people in a family wish to share images to one frame, such as multiple grown children trying to populate a picture frame for one set of grandparents. When the second child sends a new memory card with images of their family, all the photos of the first child's family are removed to make space for the new images.

Another prior art method of sharing photographs or other media is a dedicated wireless picture frame, such as the KODAK EASYSHARE™ frame. These dedicated picture frames have an email address, so that people can send the photographs directly to the frame. Some of the frames also connect to sites such as FACEBOOK™, to pull images as they are posted. However, this gives the frame owner only partial control over who can send media to their frame. Furthermore, it does not provide a high resolution copy of the media to the user, to enable the user to print or otherwise utilize the media.

BRIEF DESCRIPTION OF THE FIGURES

The present invention is illustrated by way of example, and not by way of limitation, in the figures of the accompanying drawings and in which like reference numerals refer to similar elements and in which:

FIG. 4 is an illustration of available controls while viewing the shared accumulated media in the media sharing and display application.

FIG. 8 is an illustration of available controls for adjusting the slideshow display.

DETAILED DESCRIPTION

Figure 1:
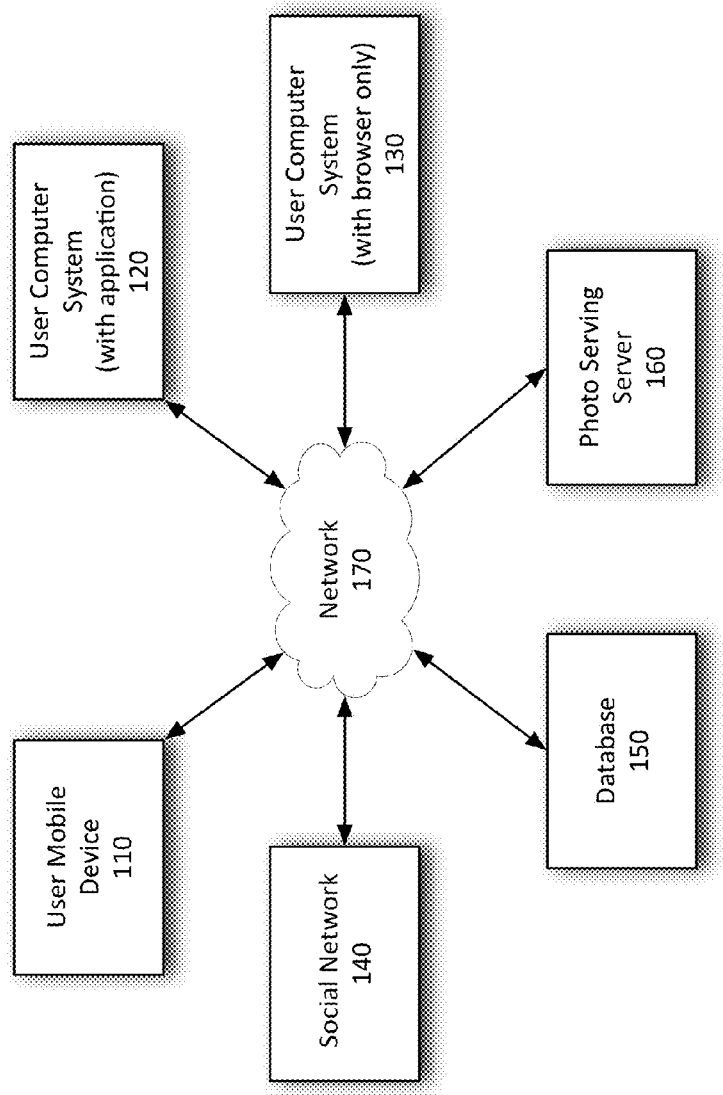
FIG. 1 is a block diagram of one embodiment of a system in which the present invention may be used.

Despite the plethora of options for sharing digital photos and videos, there is no solution that provides an ideal way to share media with immediate family and very close friends who may want to enjoy shared photos and videos recurrently. Specifically there is no prior art method to share photos and images that meets these criteria: 1) displays shared photos and videos recurrently and persistently for repeated enjoyment, 2) requires very little or no effort on the part of the recipient(s) to enjoy recurrent viewing of the media, 3) accumulates and displays shared media received over time and from multiple senders 4) automatically provides the recipient(s) with permanent copies of the media for their own use to print or otherwise use the media and 5) allows the recipients to determine from whom they want to receive such media. In one embodiment, the present invention provides all or a subset of these features to provide an improved method of sharing photos and videos.

The present invention relates to media sharing. In particular, in one embodiment, a method of sharing and persistently displaying photographs and short video clips, shared between close friends and family members or any group of people is described. The system, in one embodiment, is composed of desktop software, mobile device applications, an integrated server-based online service, and a website where online services are accessed. The combination of desktop software and online services creates a user experience for both sharing and persistently displaying digital photos and videos on another person's computer or mobile device. We refer to this invention as a media sharing and display (MSD) system or application. Note that although the term "application" is used, the MSD system may include multiple separate software applications, which may be run separately. In another embodiment, a single application may include the sending subsystem, receiving subsystem, and display subsystem.

The media sharing and display system in one embodiment provides seven key benefits to users. The integration of these benefits into one system has not been achieved in any prior art methods for sharing digital media. In one embodiment, the media sharing and display application includes one or more of these benefits: 1) Media received from family and close friends is accumulated and recurrently displayed so recipients can enjoy it repeatedly. We believe this benefit is very appealing to immediate family, such as grandparents, parents, siblings and very close friends. 2) Shared photos and videos can automatically begin displaying when the computer or mobile device is turned on, enabling frequent enjoyment of the media without needing to launch an application or service 3) Recurrent and frequent enjoyment of the media requires very little or no effort on the part of the recipient(s). 4) The application accumulates and displays media received over time and from multiple senders, 5) Recipients automatically receive permanent copies of the media for their own use to print copies or otherwise use, 6) Recipients have full control over whose shared media they choose to include in their recurrent media display. 7) The ability for someone sharing photos/videos to use one system to send to recipients who have different preferences for methods of receiving media. For example, while close friends and family may enjoy recurrent display of the media and the receipt of permanent copies, more casual friends and extended family may prefer to receive the media in more a traditional "limited online viewing" option, and others will prefer to enjoy the media on a social network such as FACEBOOK™ or GOOGLE+™. By allowing the sender to share in all these ways within one sharing solution, each recipient can receive the media in a method that is appropriate for them, and the sender does not need to use multiple sending solutions to meet the needs of their various recipients.

The system, in one embodiment, allows one person (the sender) to send a "media package," filled with photos and video clips to another person (the receiver). The media package is designed to be displayed in the recipient's "virtual" picture frame (the frame), which may be on a desktop computer, a tablet computer, a mobile device such as a smartphone, or another type of computing device. The frame, in one embodiment is part of the media sharing and display application that runs on the receiver's computer desktop persistently.

In one embodiment, the frame continuously displays the photos and videos the sender shared with the receiver by rotating through them, or otherwise displaying one or more photos/video clips at a time. In one embodiment, when the computer is unused for a period of time, the frame may become a screensaver, expanding to fill the screen. This essentially transforms the computer monitor or screen into a large digital picture frame that can easily be updated with new images by remote friends and family. In one embodiment, on a mobile device, the frame may become a screen saver as well, when the mobile device is plugged in. The frame (software application) persists on the receiver's computer desktop, in one embodiment. That is, in one embodiment, it runs each time the computer is turned on and remains active on the desktop unless closed by the receiver.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a block diagram of one embodiment of a system in which the present invention may be used. The system includes one or more devices which can send and/or receive the media packets, and display the contents of the media packets. The user devices may be a mobile device 110, a computer system including a desktop application 120, or a computer system that does not include the desktop application but rather only a browser 130. In one embodiment, the recipient or sender may also be a social network 140.

The media packet, in one embodiment, may be sent through photo serving server 160. The photo serving server 160 may, in one embodiment, also provide image content, such as frame designs. In one embodiment, such data may be obtained from a database 150 which may be accessible directly through server 160 or independently. In one embodiment, these elements may communicate via network 170. Network 170 may be the Internet.

Figure 2:
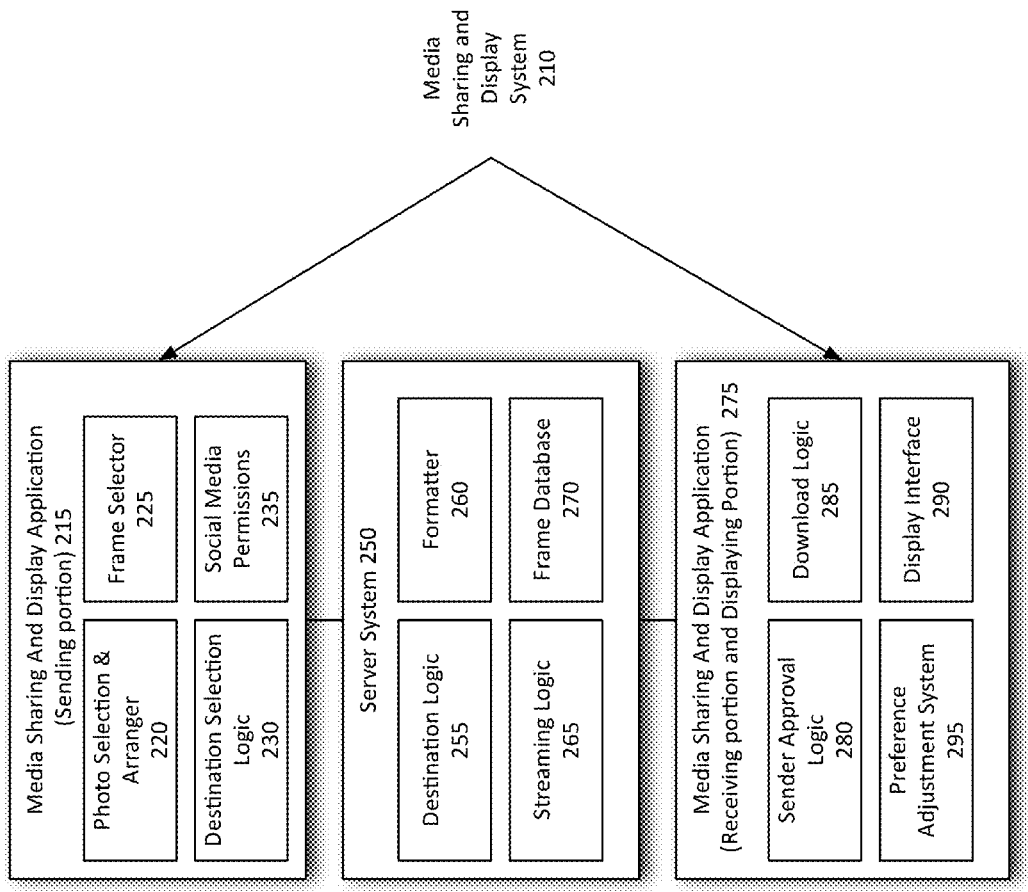
FIG. 2 is a block diagram of one embodiment of the media sharing and display application and server.

FIG. 2 is a block diagram of one embodiment of the media sharing and display system and server. The media sharing and display system 210 includes the sending portion 215 and the receiving/displaying portion 275. The sending portion 215, in one embodiment, includes photo selection & arranger system 220, which enables a sender to select media objects to include in a media packet. The frame selector 225 enables the user to add a frame to the selected media objects. Destination selection logic 230 enables the sender to select the one or more recipients for the media packet. In one embodiment, if one of the destinations is a social media site, social media permissions 235 must include that social media site. Otherwise, the user must provide the permissions, prior to the system being able to post on the social media site.

The packet prepared by the client portion 215 is sent to server system 250. Server system 250 uses destination logic 255 to identify the destinations, and formatter 260 to appropriately format the media in the packet for each of the destinations. The destinations may include an application (receiving/displaying portion 275), one or more social media sites, and a browser-accessed version, which is hosted, in one embodiment, on server system 250 or an associated database. One of skill in the art would understand that though the term "server" is used, the system may be hosted in the cloud, such that portions of one or more servers are used to provide these services, and the data may be distributed, and portions of the server system 250 may be remotely hosted from the other aspects, etc.

Frame database 270 provides frames available to the sender 215 and recipient 275. In one embodiment, a frame database 270 may be available to the sending portion 215, and receiving/displaying portion 275, to keep the local frame databases updated, as new designs or features are added. In one embodiment, the sending portion 215 and/or receiving/displaying portion 275 may automatically download new frame designs, as they become available. In another embodiment, the user may need to manually access the frame database 270 to download new designs. Although the term "frame" is used, that only indicates a media object external to the media object provided by sender. Thus, the term "frame" may refer to a structure such as a three-dimensional cube that is shown on the user's screen with photos on each side, an animation that presents one or more accumulated images in rotation, or simply a decorative scrollwork or similar image shown in conjunction with media objects.

Streaming logic 265 enables server 250 to provide a web view of media objects. This may be particularly useful for users who do not have the receiving/displaying application, who are utilizing a system with limited memory, or who have a more distant social connection to the sender and prefer to view the photos only once or twice, as more typically experienced in most photo sharing solutions.

Figure 9A:
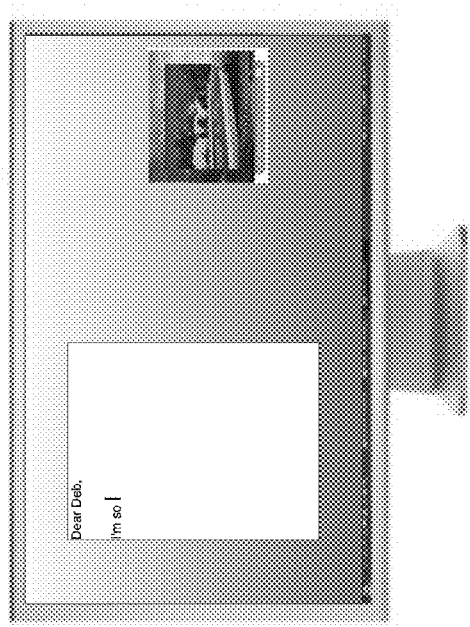
FIG. 9A-9C are embodiments of the different displays of the shared media.
Figure 9B:
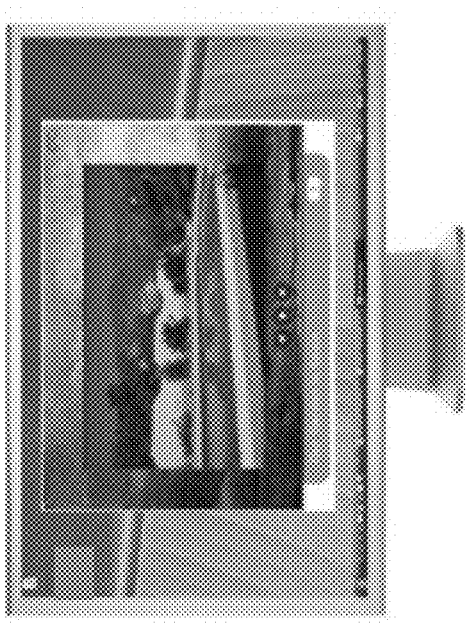
Figure 9C:
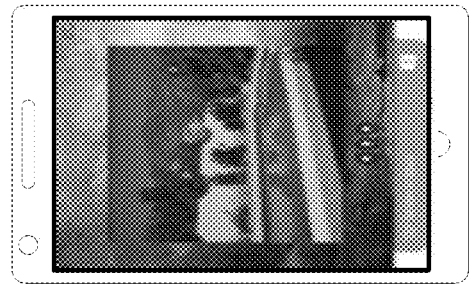

The receiving/displaying portion 275 includes sender approval logic 280, in one embodiment. A recipient may optionally reject a sender, e.g. determine that they do not wish to accept media packets from a certain sender. The download logic 285 downloads the media data, when the recipient approves it. In one embodiment, the download logic 285 downloads a high quality copy of the media items in the packet, to enable the user to print, order prints, or otherwise utilize the media. Display interface 290 displays the media in a slideshow to the user, in one embodiment. As noted, in one embodiment, the slideshow is persistent, residing on the user's desktop unless the user actively closes it. FIGS. 9A-C illustrates some embodiments of the appearance of the slideshow in various contexts. In one embodiment, as shown in FIG. 9A, the user may allow the display to take over the entire screen of a desktop or laptop computer. This mode, which may be referred to as screensaver mode, provides the highest resolution for the images, and is nice when the user is not otherwise utilizing the computer system. FIG. 9B illustrates an example in which another application is active. The media sharing and display system remains on the screen, while the other application is being used. This provides a smaller view, but enables the user to enjoy the media slideshow, while performing other activities on the computer system. FIG. 9C illustrates an example of the media sharing and display application on a mobile device. In one embodiment, the mobile device displays the slideshow as a full-screen application. In one embodiment, if the mobile device is capable of doing so, the slideshow may operate as a screensaver when the device is plugged in.

Preference adjustment system 295 enables the recipient to change the settings and preferences of the slideshow. These changes may range from changing a maximum number of items in the slideshow, to the speed of the slideshow, or the differential treatment of certain media items in the slideshow. All these features are discussed in more detail below.

Figure 3:
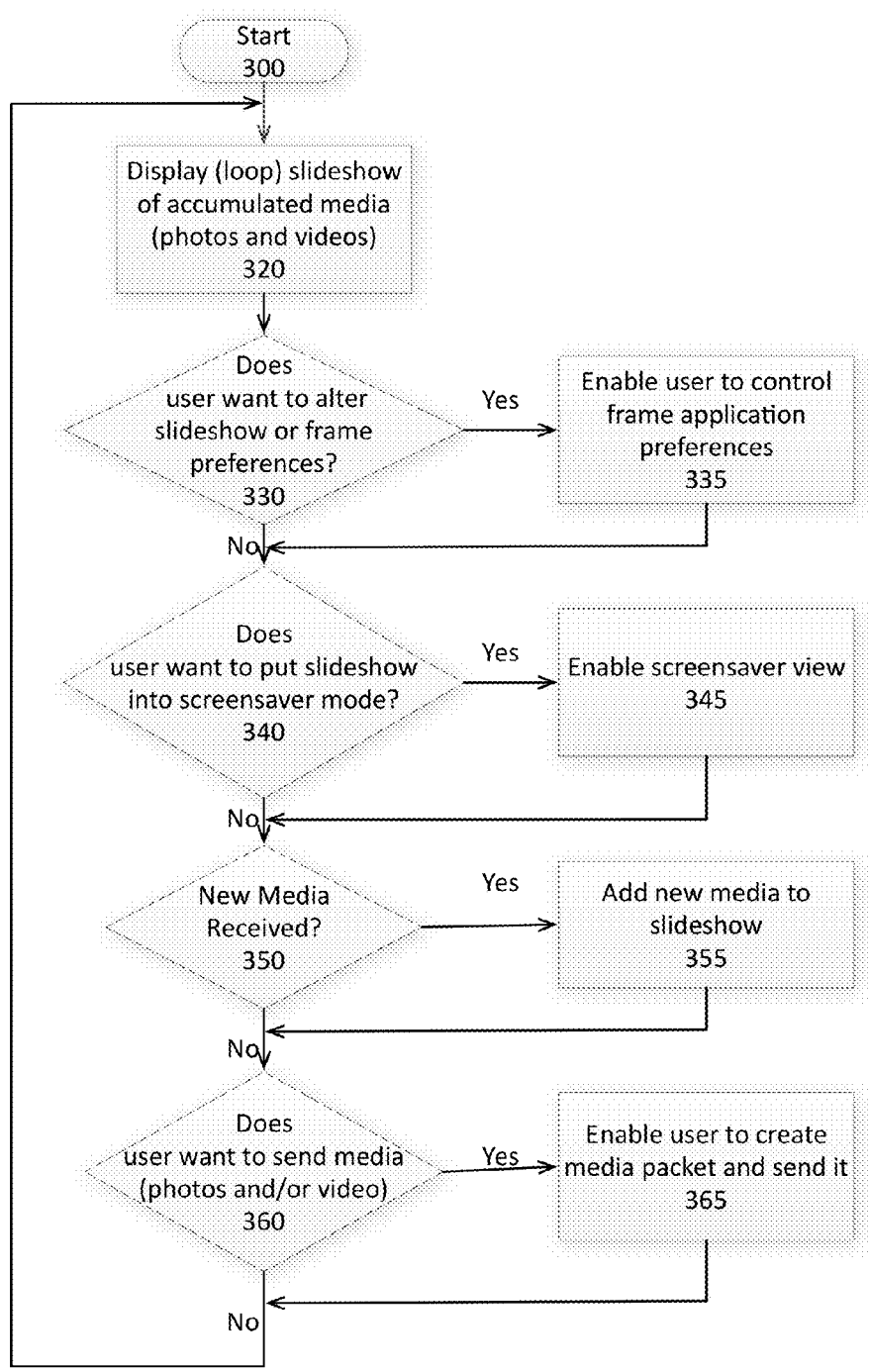
FIG. 3 is an overview flowchart of one embodiment of viewing accumulated media in the media sharing and display application and receiving new media.

FIG. 3 is a flowchart of one embodiment of viewing the media in the media sharing and display system. This flowchart, in one embodiment, is on the user's computer system, whether that system is mobile, laptop, or desktop computer. The process starts at block 300. At block 320, the accumulated media is shown in a looping slideshow, in accordance with the user's preferences. In one embodiment, this may be done as a screen saver, background application, or foreground application. In one embodiment, the display is in a frame.

Returning to FIG. 3, at block 330 the process determines whether the user wishes to alter the slideshow or frame preferences. If so, at block 335, the user can control the frame display preferences. FIG. 4 illustrates some exemplary controls that may be used to alter the slideshow. In one embodiment, these controls are available to the user while he or she is viewing the slideshow. These controls enable the user to control the appearance of the media in the slideshow. Of course, additional controls may also be available, either while the slideshow is playing, or through settings.

At block 340, the process determines whether the user wants to put the slideshow into screensaver mode. In the screensaver mode, the entire screen shows the slideshow. The screen saver mode may be entered automatically when the user does not use the computer for a time, or manually by the user. When one of these occurs, the screensaver view is enabled, at block 345.

At block 350, the process determines whether new media has been received. New media may be received from any sender who has established a relationship with the user. If new media is received, at block 355, the new media is added to the slide show. This is described in more detail below with respect to FIGS. 5A and 5B.

Figure 6:
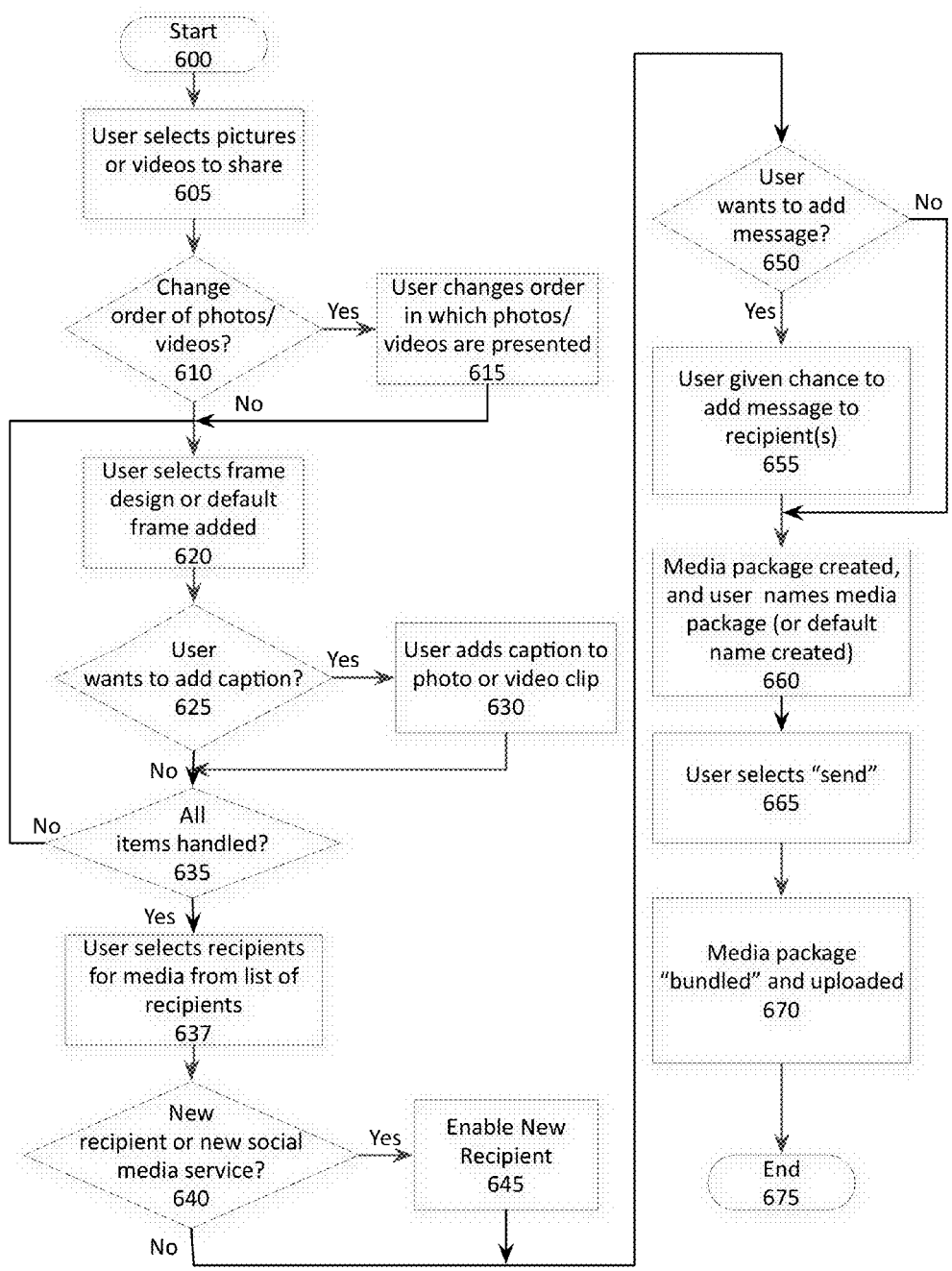
FIG. 6 is a flowchart of one embodiment of sending a media package to one or more destination(s).

At block 360, the process determines whether the user wants to send a media package. In one embodiment, media packages are sent with new photos and/or videos at any time. If the user wishes to do so, at block 365, the system enables the user to create a packet to send the media to one or more recipients. FIG. 6 illustrates this process in more detail. The process then returns to block 320. If the user does not wish to send a media packet, the process returns to block 320 directly.

Although this, and other processes are shown as flowcharts in this application, one of skill in the art would understand that these processes need not occur in the order shown. For example, in one embodiment, the slideshow of current images is being looped continuously, regardless of other occurrences. In one embodiment, an interrupt is used when new media is received, instead of continuously monitoring for the receipt of new media. The viewing of the slideshow is independent of the sending process, in one embodiment, thus enabling continuous display of the slideshow, while the user is putting together a new media packet to send out. Similar details of the processes would be understood by one of skill in the art.

Figure 5A:
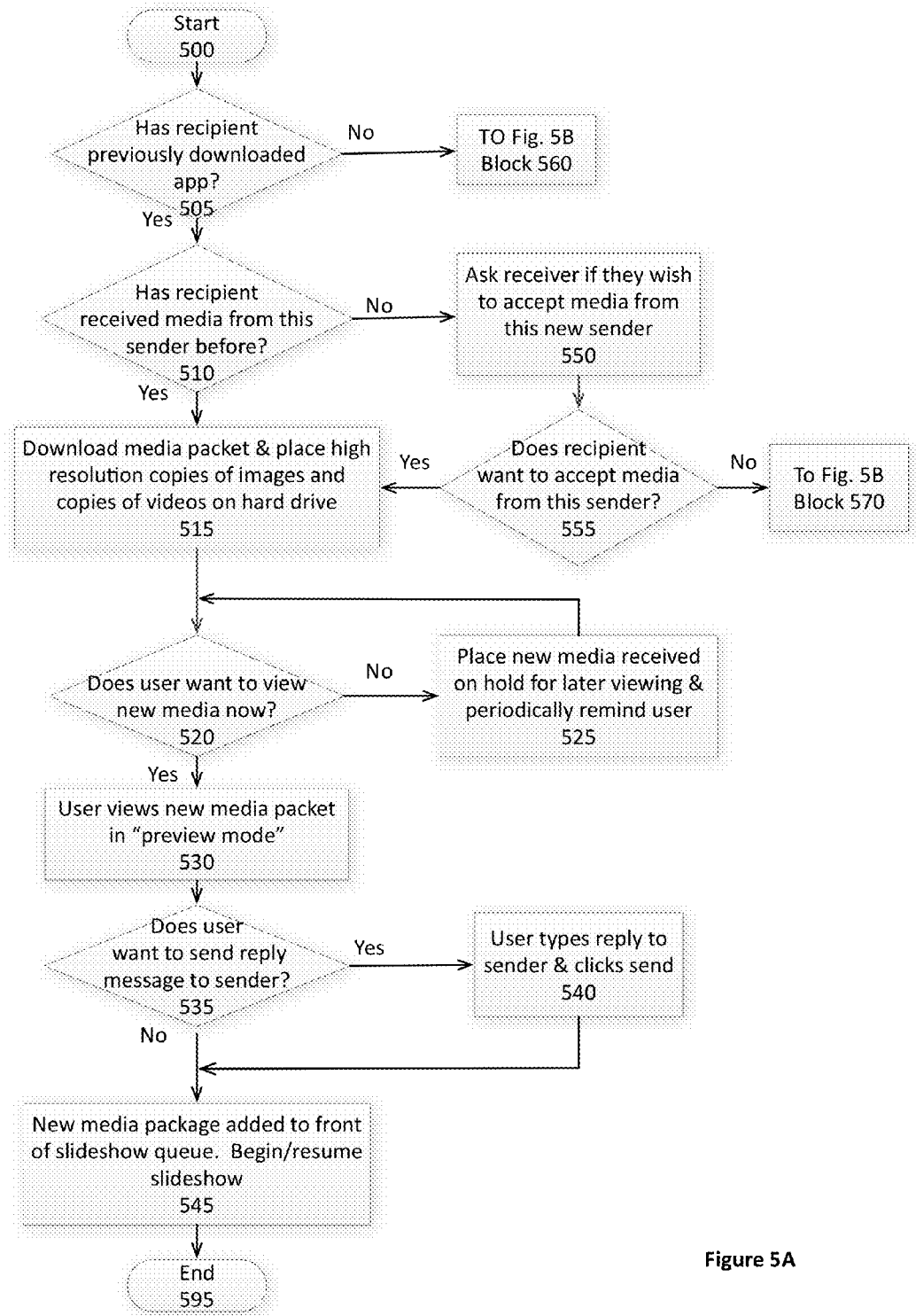
FIG. 5A is a flowchart of one embodiment of receiving a media packet in the receiving portion of the application.
Figure 5B:
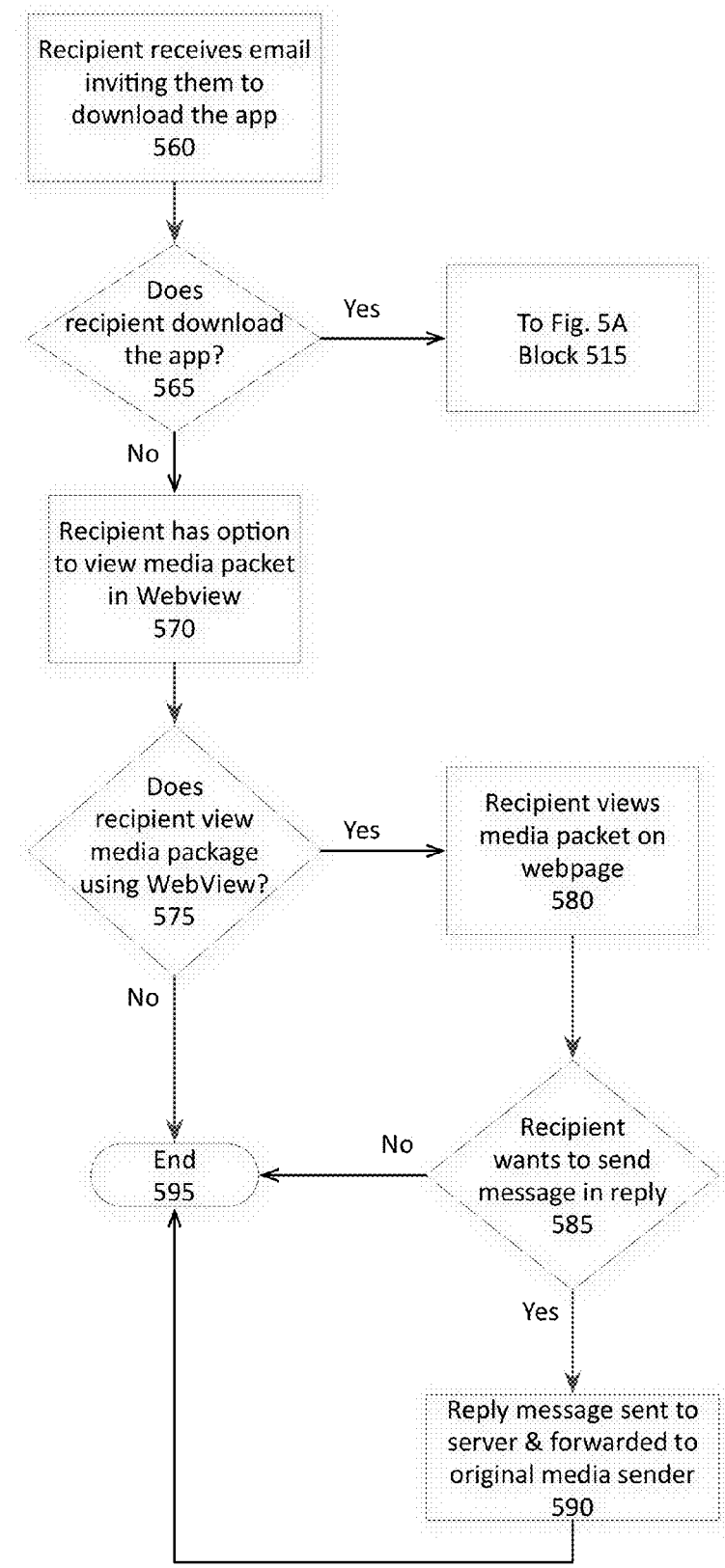
FIG. 5B is one embodiment of viewing the media packet in a webpage, rather than in the receiving and display portion of the application.

FIG. 5A-5B is a flowchart of one embodiment of receiving a media packet in a media sharing and display application (5A), or viewing a media packet in a browser (5B). The process starts at block 500. In one embodiment, this process starts when a media packet is received by the user. In one embodiment, the first time a user receives media via the media sharing and display system, they are notified by email and offered the opportunity to download the application to one or more devices to retrieve the shared media for recurrent viewing. In one embodiment, subsequent media packets' arrival may be announced via email and/or via a message within the receiving and display portion of the application.

At block 505, the process determines whether the recipient has previously downloaded the application. In one embodiment, this determination is made at the server, when a media packet addressed to a particular destination is received. If the recipient has not previously downloaded the application, the process continues to block 560, shown on FIG. 5B. If the user has previously downloaded the application, the process continues to block 510.

At block 510, the process determines whether the recipient has received media from this sender before. In general, recipients may control whether they wish to receive data from senders. If the recipient has received media before, the process continues to block 515. If the user has not previously received media from this sender, the recipient is asked if they wish to accept the media, at block 550.

If the recipient does not want to accept the media, the process continues to block 570, to enable the recipient to view the media in a web interface.

If the recipient has previously been approved, or the user wants to accept the media as determined at block 555, the process continues to block 515. At block 515, the media packet is downloaded, and in one embodiment high resolution copies of the images and videos are stored on the user's hard drive.

At block 520, the process determines whether the user wants to view the new media now. If not, at block 525, the new media is placed on hold for later viewing. In one embodiment, the user is periodically reminded to view the media. When the user indicates he or she wishes to see the media, at block 530 the user views the new media packet's contents in a preview mode. In one embodiment, the user may choose, in the preview mode, which of the media items to include in their slideshow.

The user may choose to send a reply to the sender, at block 535. The user may do so through the preview, at block 540. In another embodiment, the system automatically adds the new media to the user's slideshow, without the preview.

At block 545, the new media is added to the slideshow of accumulated media. In one embodiment, the media is added to the front of the slideshow queue. The slideshow is resumed or begun. Note that this means that the data from multiple senders is placed into the same slideshow. This enables a recipient to seamlessly see media from multiple users, or from a single user sent in multiple sessions. This is useful, for example, in sharing photographs of grandchildren with grandparents. The grandparent need not do anything, beyond initially downloading the media sharing and display application, and authorizing the senders. After that, the frame on the desktop will be automatically populated with the most recent photos of the grand children provided by multiple children. In one embodiment, the recipient may also add additional media into the slideshow. This enables the grandparent, in the example above, to add the pictures he or she took, and incorporate it into the frame. The process then ends at block 595.

If at block 505, the recipient was found not to have downloaded the media sharing and display application, the process continued to block 560.

At block 560, the recipient receives an email inviting them to download the application. In one embodiment, the invitation includes links to download the application in various formats, e.g. a WINDOWS™, APPLE™, GOOGLE™/ANDROID™, or other operating system based computer system, including mobile telephone or tablet computer.

At block 565, the process determines whether the recipient has downloaded the application. If so, the process continues to block 515, shown in FIG. 5A.

If the recipient does not download the application, in one embodiment the recipient has the option to view the media packet via a browser in a web view. In one embodiment, the notification sent to the recipient includes this information.

At block 575, the process determines whether the recipient wants to view the media packet in web view. If not, the process ends at block 595. In one embodiment, the notification email may remain, enabling the user to download the application, or view the media in a web view at a later time.

If the user chooses to view the media in a web view, the process continues to block 580. At block 580, the media is displayed to the user on a webpage. In one embodiment, the display may be a slideshow-formatted display. The recipient may choose to send a message to the sender, in reply, at block 585. If the recipient does not choose to do so, the process ends at block 595. Note that this process would end when the user closes the web view browser window. In another embodiment, the web view may time out. In one embodiment, the user may be given a limited number of opportunities to view a particular media packet it the web view browser. This enables the server to remove all media data. If the recipient chooses to send a response, at block 590, the recipient can enter the message through the web view window, and the server forwards the message to the original sender. In one embodiment, the recipient may have the option to download the media packet for recurrent viewing after viewing it in the web view window. The process then ends.

FIG. 6 is a flowchart of one embodiment of sending a media package to a destination. The process starts at block 600. In one embodiment, the sender first acquires the media sharing and display application, to be able to send the media packets. The media sharing and display application may be downloaded. In one embodiment, the sender may use a web application version of the sending tool.

At block 605, the user selects one or more pictures or videos to share. In one embodiment, the user selects the photos or videos to share by clicking on them and/or by dragging them to the right side of the screen. The user may do editing in situ, including in one embodiment zoom, crop and rotate images. In one embodiment, the system provides a set of media images that are the "most recent" for sending. A user may be able to browse their hard drive for other images. In one embodiment, the user may also browse on FACEBOOK™, FLICKR™, KODAK GALLERY™, SHUTTERFLY™, INSTAGRAM™ or other online accounts to find photos to share.

In one embodiment, videos may be automatically trimmed to 30 seconds with the first 30 seconds of the clip selected. They may be able to select where to start the 30-second clip and may be able to shorten or lengthen the selected video clip beyond 30 seconds.

In one embodiment, the selection of images and/or video clips to share starts a new package, or media packet. The complete media packet will include the images/videos to be shared, a frame design in which they will be displayed, a name for the media packet, captions and crop/zoom info associated with the media, and the contact info and sharing method chosen for each recipient of the media packet.

During this process, the sender's choices and the media packet in progress may be stored in a local database. The sender client may store the filename, the zoom, rotation, and movement in X and Y relative to its starting position. In one embodiment, video clips may be clipped to the selected length, transcoded from their original format into Adobe's flash video format or other format, and saved in the sender client.

Figure 11A:
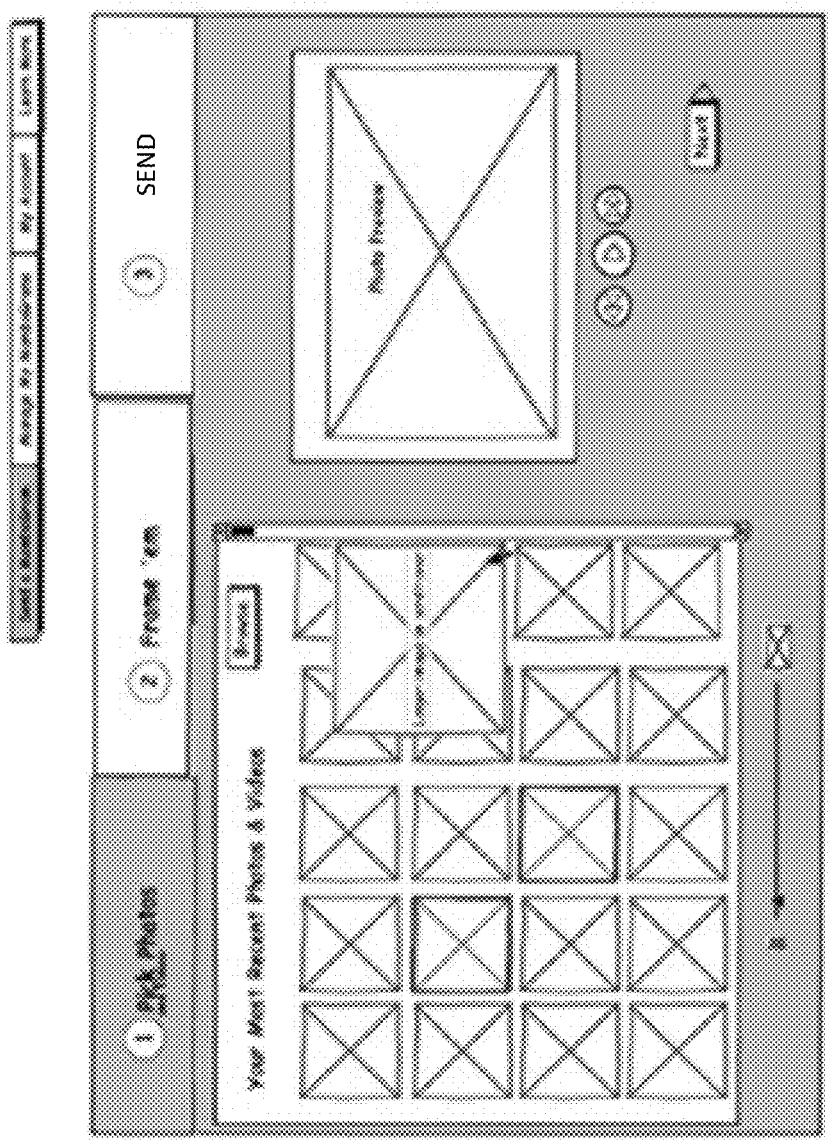
FIGS. 11A-11G are exemplary wireframes of various aspects of the invention.

At block 610, the user may indicate that he or she wishes to change the order of the media assets. If so, at block 615, the user may change the order of the media assets. FIG. 11A illustrates one embodiment of a selection and arranging interface.

Figure 11B:
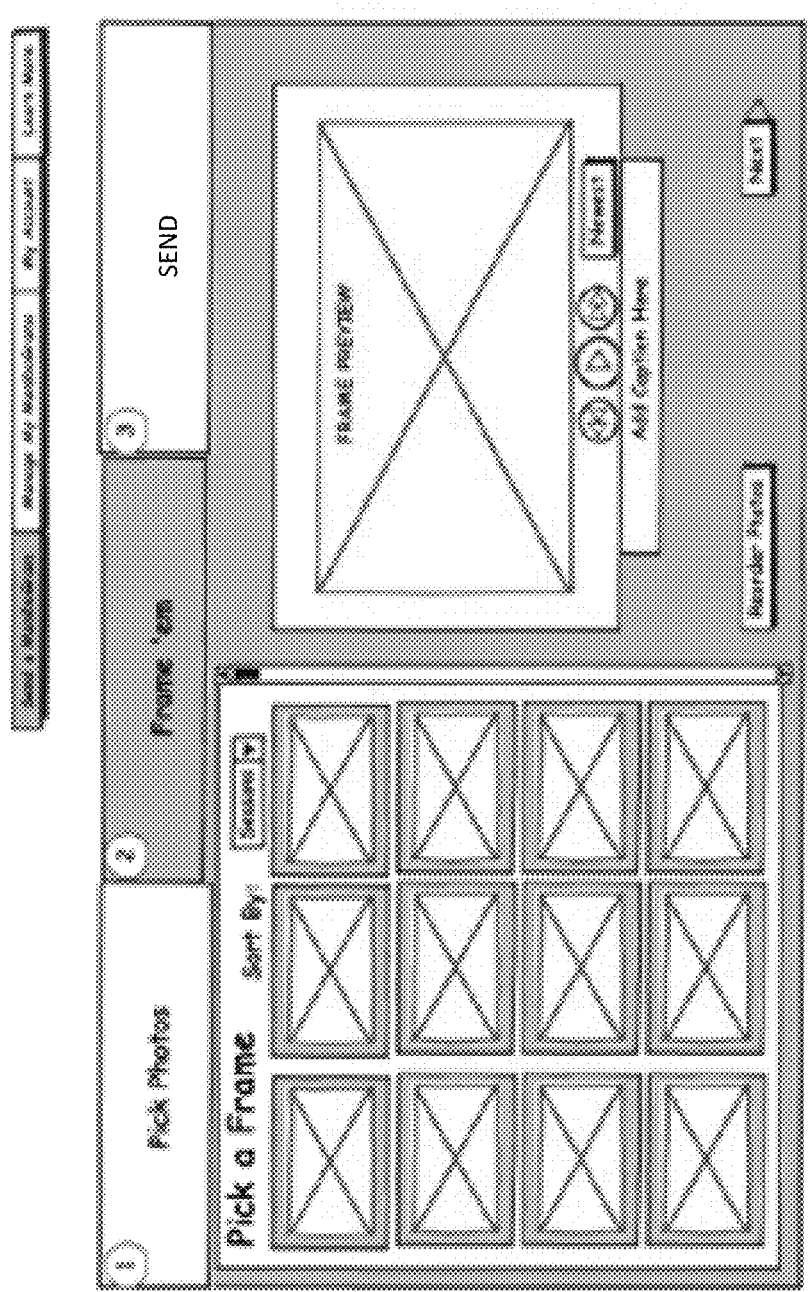

At block 620 the user selects a frame design, or a default frame is added. In one embodiment, the default may be to have no frame at all. In one embodiment, there is a system default, which a sending user may alter based on his or her preferences. In one embodiment, the default may be thematically altered, e.g. seasonal or holiday themed, as appropriate. FIG. 11B illustrates one embodiment of selecting a frame. The user may be able to sort the frames based on a set of characteristics (e.g. color, season, occasion, aesthetic, name, etc.) and select one by clicking on it. In one embodiment, the user may be able to design a custom frame.

At block 625, the user may indicate an interest in adding captions to one or more images. If that is the case, at block 630, the user may add captions to the media item. In one embodiment, in addition to captions, the user may add tags. For example, tags may include the names of the individuals pictured, the date and/or location where the image was taken, the name of the sender, or other relevant metadata. In one embodiment, some tags may be automatically populated by the system, based on data from the camera that took the media.

At block 635, the process determines whether all items have been handled. If some items remain to be captioned or tagged, the user can continue to do so, in blocks 620-630.

Figure 11C:
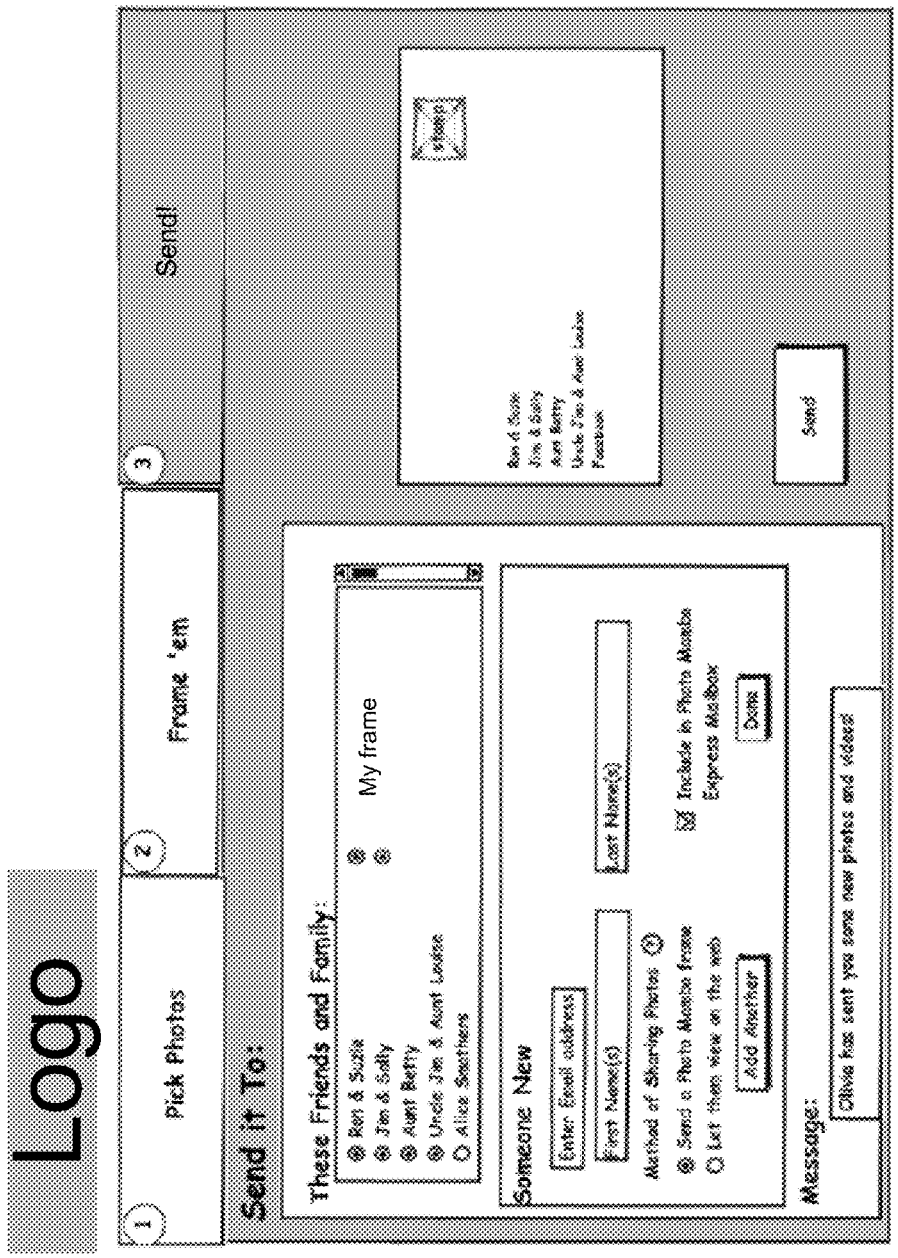
Figure 11D:
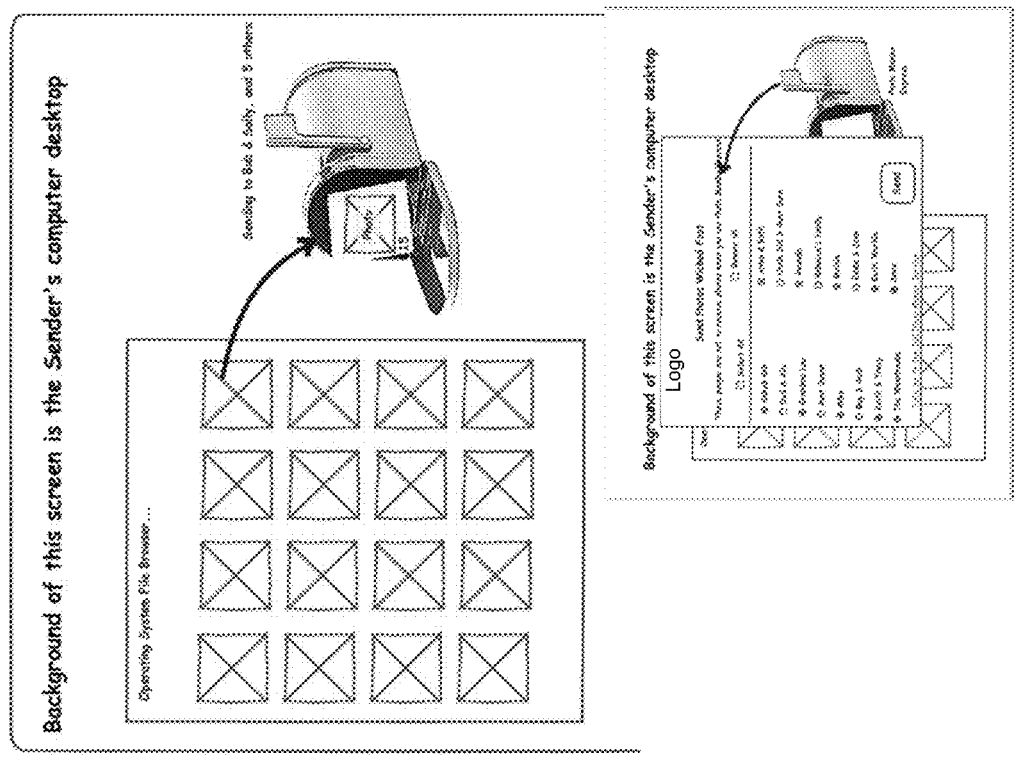
Figure 11E:
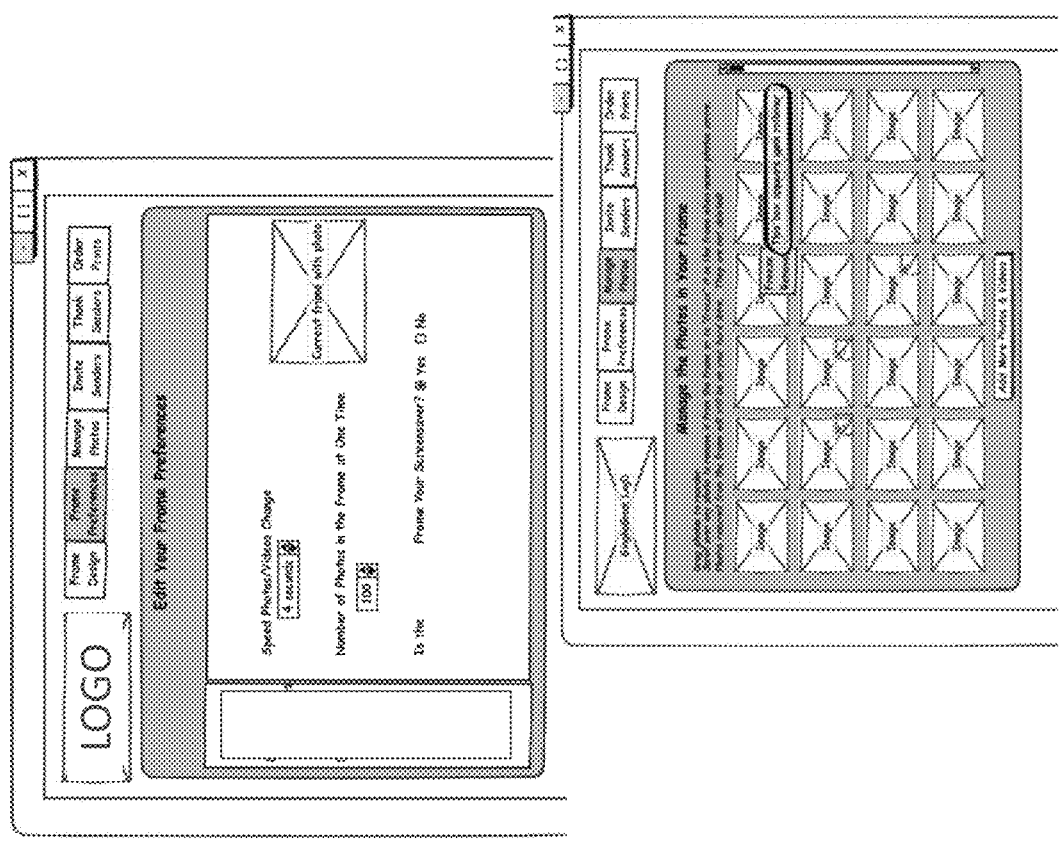

If all items have been handled, the process continues to block 637. At block 637, the user selects one or more recipients for the media. In one embodiment, the selection is from a list of recipients. FIG. 11C illustrates one embodiment of a user interface that may be presented to select recipients. In one embodiment, previous recipients may be shown, and selectable via checkmark, and additional recipients may be manually added. In one embodiment, the system may provide a fast send option to a set of recipients who generally receive the same media data set. For example, a user may wish to send the same photos to all four grandparents. The user may create a "express list" with these recipients, and the system may provide a single click send to this group of recipients. FIG. 11D illustrates one embodiment of a user interface using a "express list" metaphor for a group of recipients.

Returning to FIG. 6, at block 640, the process determines whether the recipient is a new recipient or a new social media service. In one embodiment, in addition to sharing the media directly to individual users via the media sharing and display application, a sender may also share the media to a broader set of friends and family by sharing to one or more social media/social network services such as FACEBOOK™, TWITTER™, GOOGLE-PLUS™, and other social networks that allow sharing of media.

Figure 7A:
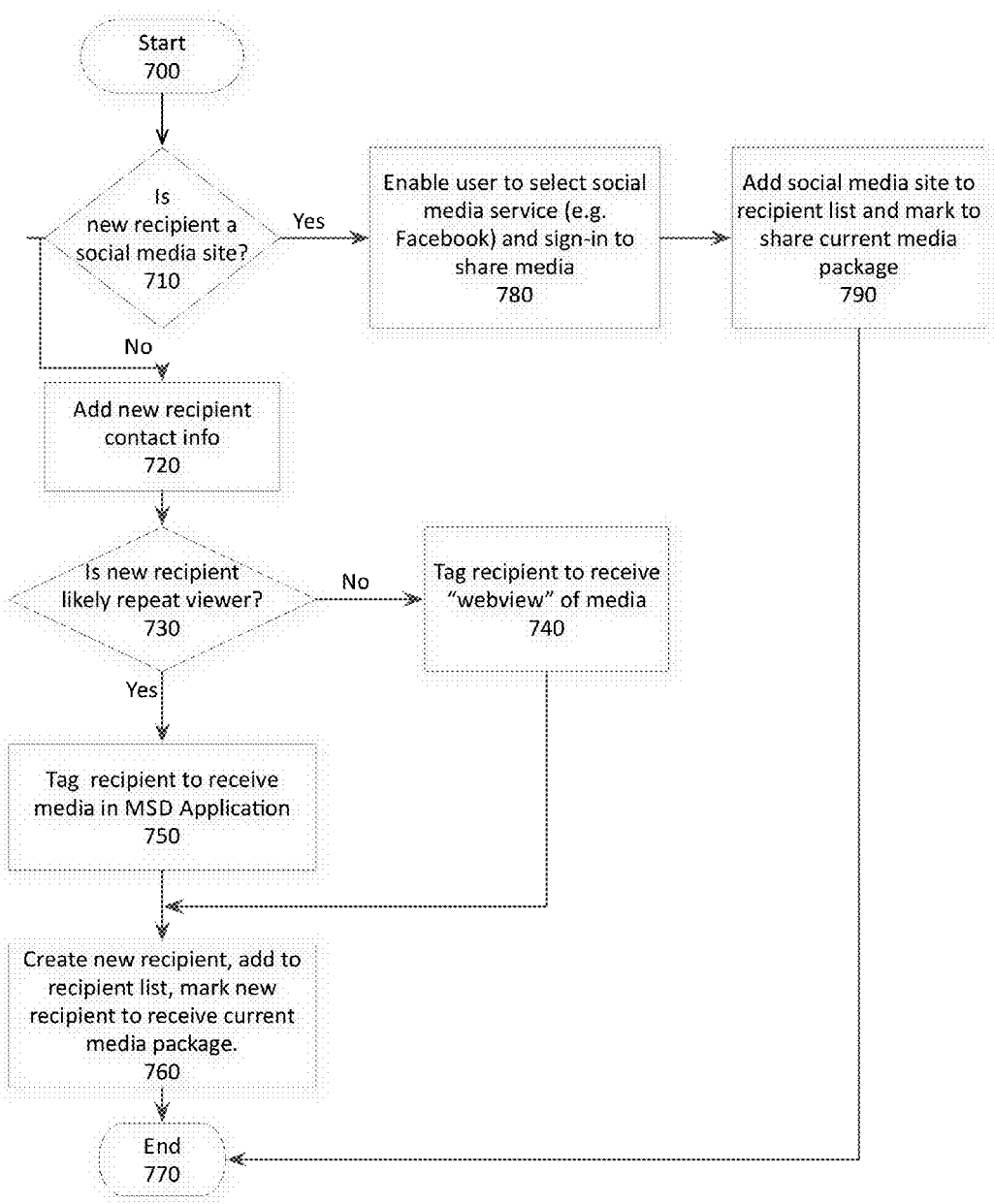
FIG. 7A is a flowchart of one embodiment of adding a new recipient.

If the recipient was a new recipient, at block 645 the new recipient is enabled. FIG. 7A describes this process in more detail. The process then continues to block 650. If none of the recipients were new, the process continues directly to block 650.

At block 650, the process prompts the user whether he or she wishes to add a message. The message may be uniform across all recipients, recipients, or may be directed separately to various recipients. In one embodiment, the message may be the content of the notification email for new recipients, the text of the post on the social media site, etc. If the user wishes to add a message, at block 655 the user is provided the opportunity to add the message. The process then continues to block 660.

At block 660, the media packet is finalized. In one embodiment, the user may name the media packet. In one embodiment, the default name may include the date and the sender's identity.

At block 665, the user selects send, and dispatches the media packet to the server.

At block 670, the media packet is bundled and uploaded to the server. The server in turn may create, in one embodiment separate versions of the media package for recipients with different interfaces. For example, the media package directed to a user's personal computer may be different than the media package directed to a mobile device with a limited screen and limited memory, which may in turn be different from the media package generated for a social media site. One embodiment of the process untaken by the server is discussed in FIG. 10.

In one embodiment, the media package for a computer, or a target device without significant memory limitations, may include high-resolution copies of all media items. In one embodiment, the media package for a low-memory device such as a mobile device with bandwidth and/or memory limitations, may be lower resolution copies, or potentially streaming links only. For a social media site, in one embodiment, the media package may be a slideshow incorporated into a format that can be displayed on the social media site. The slideshow may be hosted on the server, or alternatively the media package may include data to upload a copy of the slideshow to the social media site's memory.

The process then ends, at block 675.

FIG. 7A is a flowchart of one embodiment of adding a new recipient. The process starts at block 700. In one embodiment, this process is invoked when a sender includes a new recipient in the list of recipients. The person sharing media can determine, for each new recipient what mode of sharing is most appropriate for them.

Figure 7B:
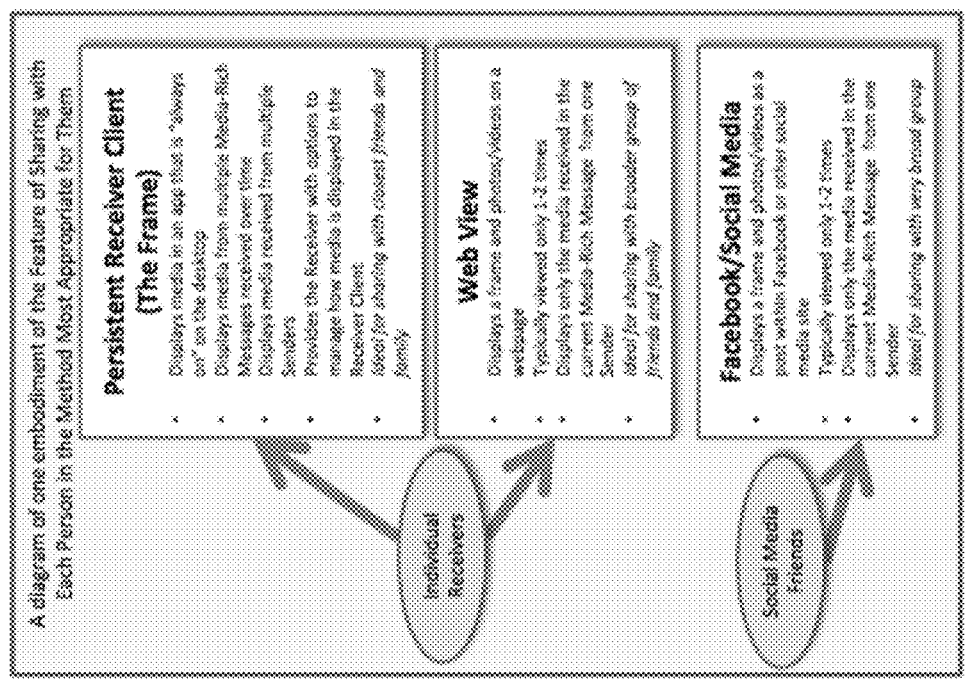
FIG. 7B is a diagram of one embodiment of the destinations to which the media package may be shared.

FIG. 7B illustrates the various types of sharing. Individual recipients may be users of the media sharing and display application, or may view the media through the web view, as discussed above. Social media recipients may view the shared media within a social media site. In one embodiment, if the social media site is capable of providing the slideshow interface, the system may provide the slideshow, as the post to the social media site.

At block 710, the process determines whether the new recipient is a social media site. If so, at block 780, the user may select the social media site, and sign in. In one embodiment, the user must provide permissions to the sending application, to send the media package directly to the social media site. Once those permissions, and the password, are available to the application, at block 790 the social media site is added to the recipient list, and the current media package is marked to be shared with the social media site. In one embodiment, the user may authorize the social media site for future posts. In another embodiment, the user may provide a one-time authorization only. If only a one-time authorization is provided, the social media site recipient is treated as a new recipient for each subsequent media packet. The process then ends at block 770.

If the recipient is not a social media site, the process continues to block 720. At block 720, the new recipient's contact information is added to the system. In one embodiment, the user may do this manually. In another embodiment, the user may import the contact information from an address book, email account, or other data source.

At block 730, the user may select whether the user is likely to want to view the media recurrently and receive permanent copies, or if they will prefer to view the media only once or twice. For example, immediate family members, such as grandparents, parents, or siblings, and very close friends may enjoy viewing the shared photos and videos repeatedly and may want to receive permanent copies to keep. More distant relatives or casual friends may prefer to view such media only once or twice and may not want to receive permanent copies.

If the user is not going to be a repeat viewer, at block 740, the recipient is tagged to receive a web view of the media. In one embodiment, this also enables the sender to set restrictions of viewing, restrictions on downloading or printing, etc. The process then continues to block 760. If the recipient is likely a recurrent viewer at bock 750, the recipient is tagged to receive the media in the media sharing and display application. The process then continues to block 760.

At block 760, the new recipient is created, and added to the recipient list. The new recipient is marked to receive the current media package. The process then ends at block 760.

FIG. 8 is an illustration of available controls for adjusting the slideshow display. In one embodiment, the recipient may alter the experience of a received media package in various ways. In one embodiment some of the sender-selected features that may be altered include the frame design, fade-over format, ordering of the items in the packet. In one embodiment, the user may also adjust the idle time before the screen saver is initiated, the speed of the slideshow, and the total number of items in the slideshow. In one embodiment, a default setting for each of those items is adjustable by the user.

Figure 11F:
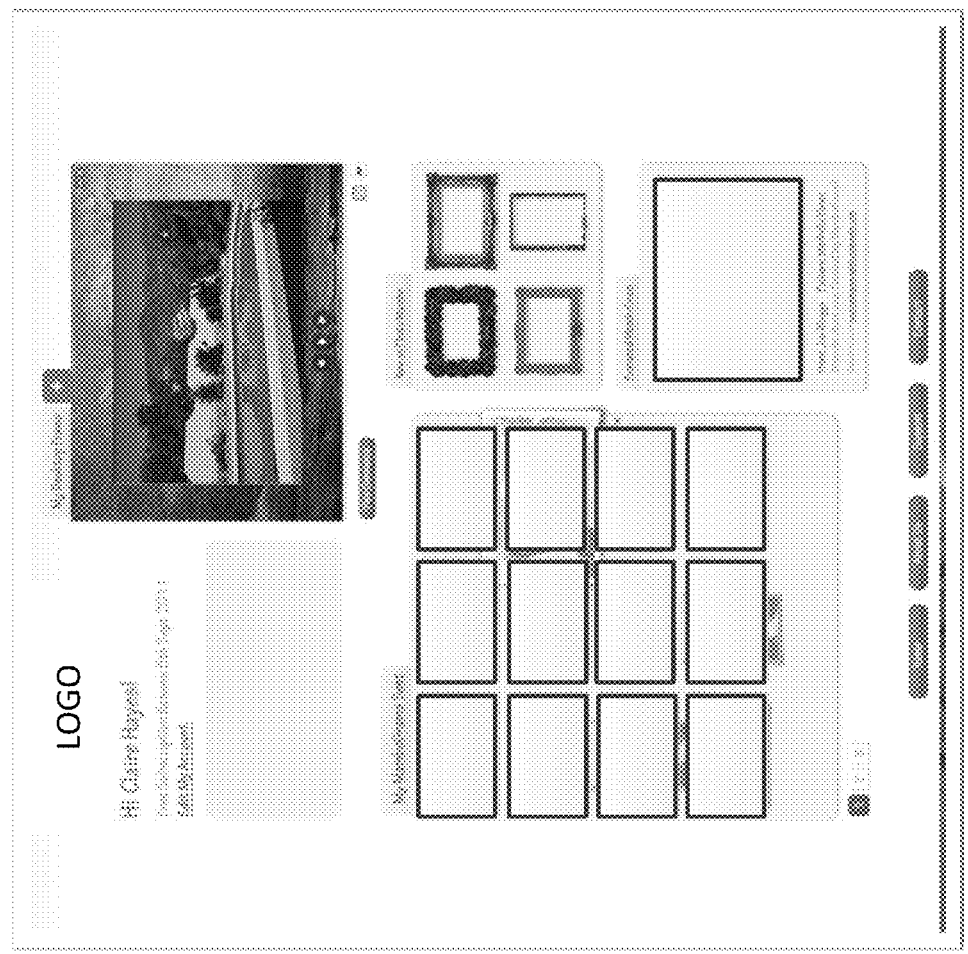

Regarding the number of media items in the slideshow, in one embodiment, the system is a First-In First-Out (FIFO) buffer, in which only the 500 most recent media items received are shown. However, the user may alter this setting, to include more, or fewer, media items. In one embodiment, the user may also alter the FIFO nature of the slideshow. By setting ordering preferences for the media items, for example, the user may exempt certain media items, or certain recipients' media items from the FIFO nature of the buffer. FIG. 11F illustrates one embodiment of the user interface feature enabling a user to change some user preferences.

The user preferences may be set on a per-item basis, or on the basis of any of the metadata available. For example, the preferences may be set based on the sender's identity, the tagged identity of the individuals shown, the location, date, subject, etc. In one embodiment, the recipient may further tag images. For example, the recipient may create a unique tag (e.g. "keeper") and indicate that all media items with that tag should not be rotated out of the buffer, no matter their age. The user may also set the FIFO on a per-sender basis, e.g. the last 15 media items sent by any sender are included in the slideshow. Other ways of arranging the media items whether by rule or manually may be used. In this way, the recipient may have a customized experience, viewing those media items that the recipient wishes to see on an infinite loop of a slideshow.

Figure 11G:
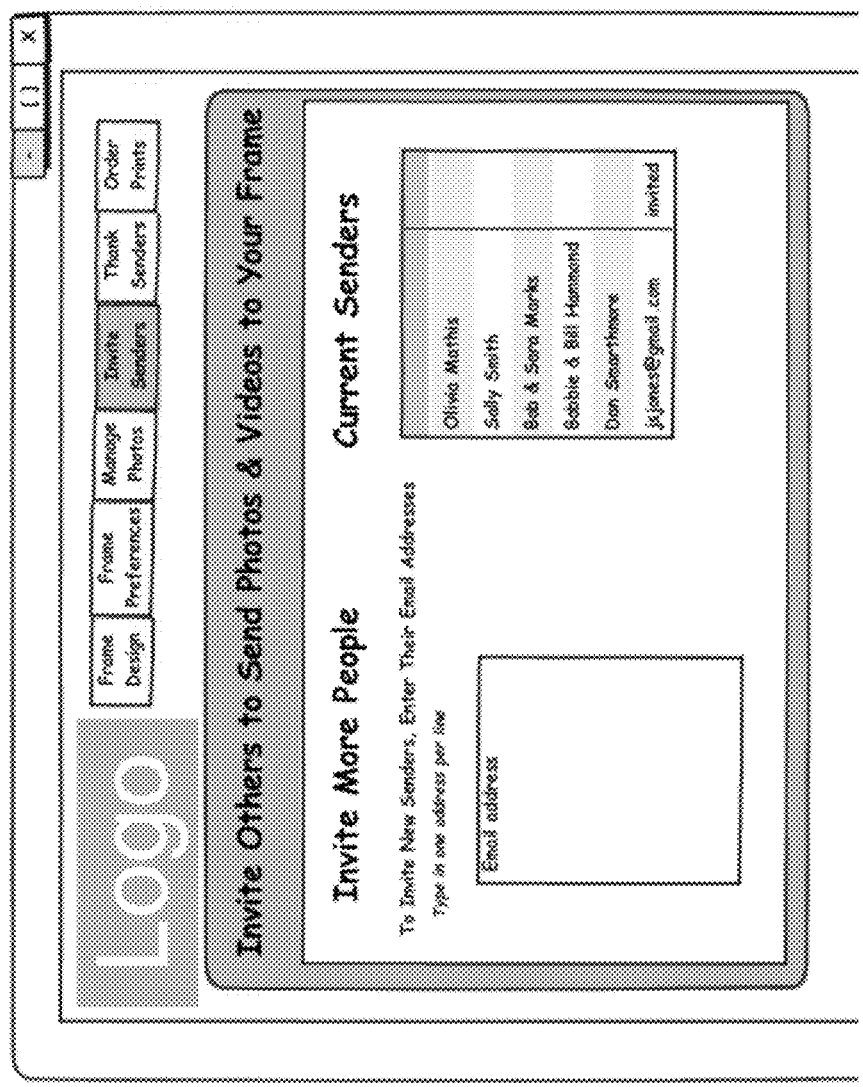

In addition to altering the slideshow experience, the user interface shown to recipient may enable the recipient to send additional messages to the senders of any of the media items, as shown in FIG. 11G. Furthermore, in one embodiment, a user may invite others to send media to their frame. One embodiment of a user interface that may be used to do this is shown in FIG. 11H. In one embodiment, this enables a grandmother who receives images into her frame from one child, to invite the other children to also send images to be included in the same frame. This enables an easy interface to provide the continuously refreshing display of photos, without requiring the recipient to manually add media to the frame or to manage the media.

Figure 10A:
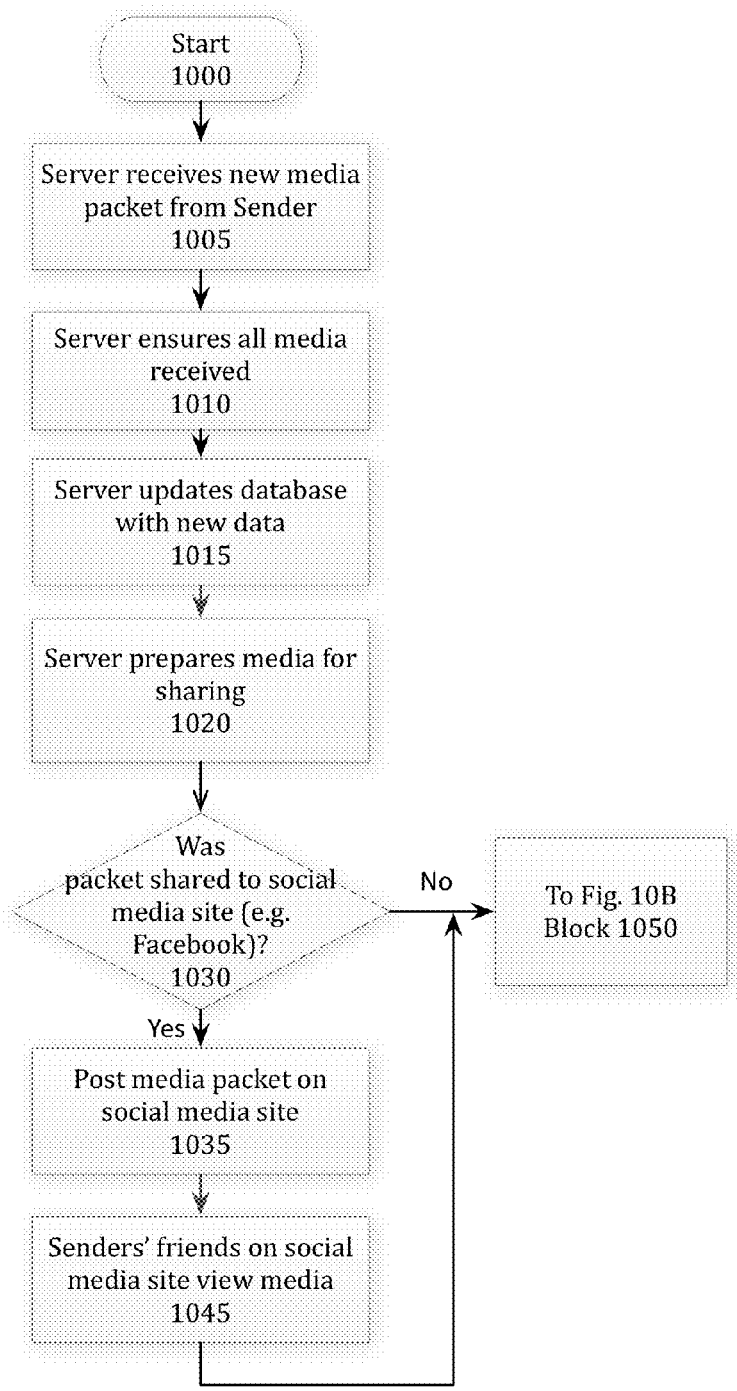
FIG. 10A-10B are a flowchart of one embodiment of a server accepting a media package from a user and sending it to one or more users.
Figure 10B:
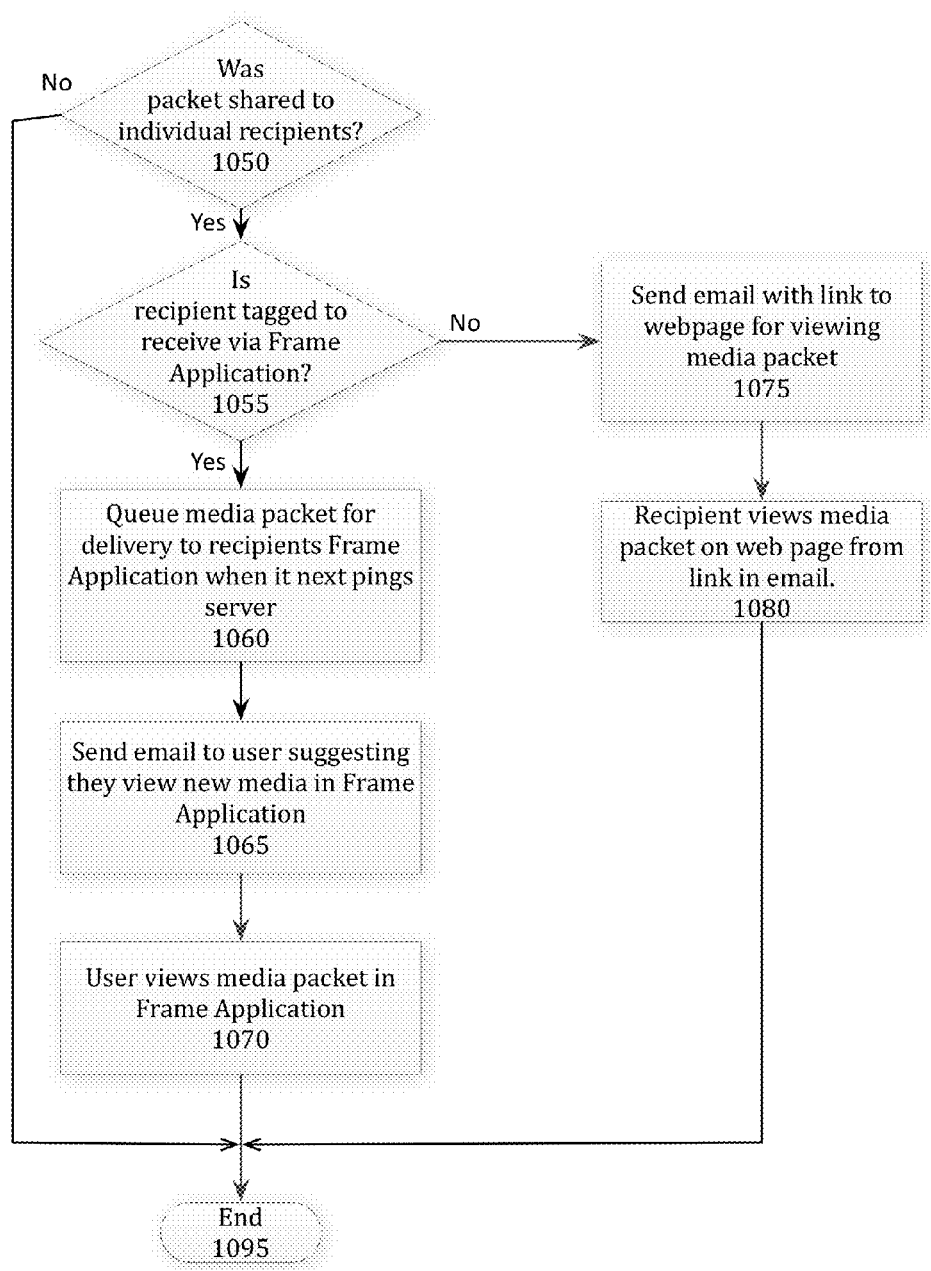

FIG. 10A-10B are a flowchart of one embodiment of a server accepting a media package from a user and sends it to one or more users. The process starts at block 1000.

At block 1005, the server receives a new media packet from the sender. This is a packet built by the client or web application, as described above. It has one or more destinations attached to it.

At block 1010, the process ensures that all media was successfully received. In one embodiment, the header of the packet includes a list of the media items. The system ensures that all media was received. If it was not, in one embodiment, the server requests that the sender portion of the application resend the packet.

At block 1015, the server updates its database with the new data. In one embodiment, the database maintains the media that has passed through the server. In one embodiment, media may be aged out of the database.

At block 1020, the sever prepares media for sharing. In one embodiment, the media is placed into a format appropriate to the designated recipient(s). For recipients who have the media sharing and display application, the packet is designed to be automatically handled by the receiving application. For recipients who will stream the data, the packet includes links for the data to be streamed. For social media recipients, in one embodiment, an appropriate format is identified. For example, for FACEBOOK™ the slideshow may be shown as a video stream, since FACEBOOK™ doesn't have a slideshow capability but can play videos. Other formats may be used. In one embodiment, the formats are optimized for each recipient type/recipient device. In addition to formatting the packet, the server may also adjust the size, aspect ratio, orientation, and resolution of the media in the packet.

At block 1030, the process determines whether the packet was shared to a social media site. If it was not, the process continues to block 1050.

If the packet was shared to a social media site, at block 1035, the media packet, or media items in a format accessible through the social media network, is posted. At block 1045, the sender's friends on the social media site can view the media. In one embodiment, the posting on the social media site may suggest to the friends that if they wish to get permanent access to the files, they could download the media sharing and displaying application, and get better copies of the media if the sender has given permission. The process then continues to block 1050.

At block 1050, the process determines whether the packet was shared to individuals. If it was not, the process ends at block 1095.

If the packet was shared to individuals, the process continues to block 1055. At block 1055, the process determines whether any given recipient of the packet was indicated as receiving it via a media sharing and displaying application. If the recipient was tagged to receive it via the media sharing and displaying application, at block 1060, the media packet is queued for delivery to the recipients' media sharing and displaying application.

At block 1065, in one embodiment an email is sent suggesting that the user view the new media. At block 1070, the user views the media packet in the media sharing and display application. In one embodiment, the media packet that is downloaded to the media sharing and display application includes high resolution copies of the media objects, enabling the user to manipulate, print, and otherwise permanently enjoy the media items in the packet. The media is added to the slideshow and becomes part of the recurring display of accumulated media displayed in the frame portion of the media sharing and display application. More detail about receiving and viewing the media in the sharing and display application is given in FIG. 5A. The process then ends at block 1095.

If the recipient was not tagged to receive the media via the media sharing and display application, the process continues to block 1075.

At block 1075, the recipient is sent an email, or other communication, with a link to the web page for viewing the media in the packet. At block 1080, the recipient can view the packet on the webpage linked in the email. In one embodiment, the media is displayed on the webpage in a frame. Only the current media packet is displayed. Unlike recipients who view the media packet in the media sharing and display application, web view recipients do not view media accumulated over time or from multiple recipients. They view only the media packet just received. More detail about the process of viewing the media via the web view is given in FIG. 5B. The process then ends at block 1095.

Figure 12:
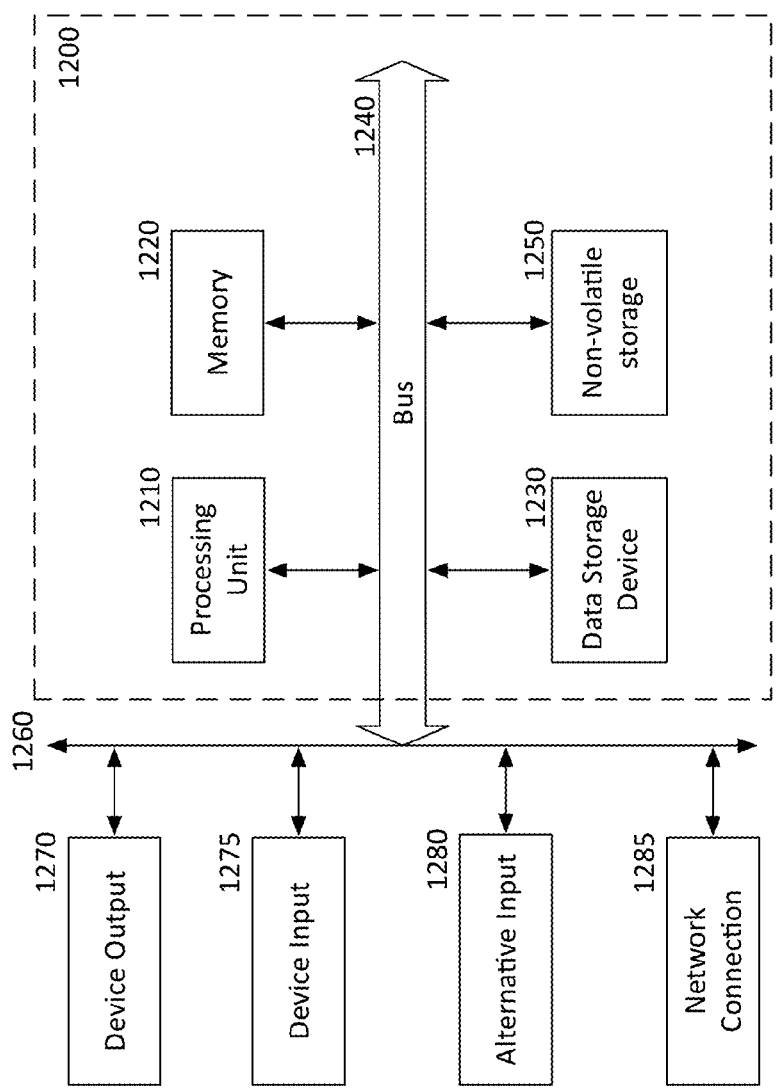
FIG. 12 is a block diagram of one embodiment of a computer system that may be used with the present invention.

FIG. 12 is a block diagram of a particular machine that may be used with the present invention. It will be apparent to those of ordinary skill in the art, however that other alternative systems of various system architectures may also be used.

The data processing system illustrated in FIG. 12 includes a bus or other internal communication means 1240 for communicating information, and a processing unit 1210 coupled to the bus 1240 for processing information. The processing unit 1210 may be a central processing unit (CPU), a digital signal processor (DSP), or another type of processing unit 1210.

The system further includes, in one embodiment, a random access memory (RAM) or other volatile storage device 1220 (referred to as memory), coupled to bus 1240 for storing information and instructions to be executed by processor 1210. Main memory 1220 may also be used for storing temporary variables or other intermediate information during execution of instructions by processing unit 1210.

The system also comprises in one embodiment a read only memory (ROM) 1250 and/or static storage device 1250 coupled to bus 1240 for storing static information and instructions for processor 1210. In one embodiment the system also includes a data storage device 1230 such as a magnetic disk or optical disk and its corresponding disk drive, or Flash memory or other storage which is capable of storing data when no power is supplied to the system. Data storage device 1230 in one embodiment is coupled to bus 1240 for storing information and instructions.

The system may further be coupled to an output device 1270, such as a cathode ray tube (CRT) or a liquid crystal display (LCD) coupled to bus 1240 through bus 1260 for outputting information. The output device 1270 may be a visual output device, an audio output device, and/or tactile output device (e.g. vibrations, etc.)

An input device 1275 may be coupled to the bus 1260. The input device 1275 may be an alphanumeric input device, such as a keyboard including alphanumeric and other keys, for enabling a user to communicate information and command selections to processing unit 1210. An additional user input device 1280 may further be included. One such user input device 1280 is cursor control device 1280, such as a mouse, a trackball, stylus, cursor direction keys, or touch screen, may be coupled to bus 1240 through bus 1260 for communicating direction information and command selections to processing unit 1210, and for controlling movement on display device 1270.

Another device, which may optionally be coupled to computer system 1200, is a network device 1285 for accessing other nodes of a distributed system via a network. The communication device 1285 may include any of a number of commercially available networking peripheral devices such as those used for coupling to an Ethernet, token ring, Internet, or wide area network, personal area network, cellular network, wireless network or other method of accessing other devices. The communication device 1285 may further be a null-modem connection, or any other mechanism that provides connectivity between the computer system 1200 and the outside world.

Note that any or all of the components of this system illustrated in FIG. 12 and associated hardware may be used in various embodiments of the present invention.

It will be appreciated by those of ordinary skill in the art that the particular machine, which embodies the present invention may be configured in various ways according to the particular implementation. The control logic or software implementing the present invention can be stored in main memory 1220, mass storage device 1230, or other storage medium locally or remotely accessible to processor 1210.

It will be apparent to those of ordinary skill in the art that the system, method, and process described herein can be implemented as software stored in main memory 1220 or read only memory 1250 and executed by processor 1210. This control logic or software may also be resident on an article of manufacture comprising a computer readable medium having computer readable program code embodied therein and being readable by the mass storage device 1230 and for causing the processor 1210 to operate in accordance with the methods and teachings herein.

The present invention may also be embodied in a handheld or portable device containing a subset of the computer hardware components described above. For example, the handheld device may be configured to contain only the bus 1240, the processor 1210, and memory 1220 and/or 1250.

The handheld device may be configured to include a set of buttons or input signaling components with which a user may select from a set of available options. These could be considered input device #1 1275 or input device #2 1280. The handheld device may also be configured to include an output device 1270 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 1210, a data storage device 1230, a bus 1240, and memory 1220, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network connection 1285.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1210. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

The media sharing and display application and method described provides a method of sharing photos and videos with others, so that the media shared can be enjoyed recurrently on their computer desktop or mobile device, and can be easily updated remotely by others, who have permission. It enables one group of persons, the senders, to transform the computer or mobile device of another group, the recipients, into a digital picture and video frame and to keep that frame updated with fresh photos and videos on an ongoing basis with minimal or no ongoing effort from the recipient(s). Although the above description provided, for example, only for a single frame, one of skill in the art would understand that the invention encompasses other logical uses of the system, for example having multiple frames, having "frames" which are three-dimensional, displaying media that is neither video nor photograph, but a third format, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A media sharing and display application and system comprising:
    a display interface to display one or more received media items on a user's display screen, where the application accumulates media received over time, from multiple recipients and recurrently displays the accumulated media, in rotation;
    a first user interface to enable selection of a plurality of media to be sent to a plurality of recipients;
    a sending system to package the plurality of media, the sending system to send the media to the recipients;
    a receiving system implemented by a processor to receive a package including the plurality of media, sent by a sender, the receiving system to:
    verify that the sender is an authorized sender for the media display application, and accept the media package when the sender is an authorized sender;
    unpack the media package, and add the plurality of media to the display interface, such that the new media is added to a rotating display of media items in the display interface.

2. The media application of claim 1, wherein the plurality of media is automatically downloaded to the computer system at an appropriate resolution level for the device.

3. The media application of claim 1, further comprising the receiving system to determine whether a maximum number of media items are in the rotating display, and if so, to remove a subset of the media items in the rotating display.

4. The media application of claim 3, wherein the subset of the media items removed comprises one or more of: an age of the media item, a subject of the media item, a sender of the media item, or a least favorite media item.

5. The media application of claim 4, wherein the age of the media item includes: an oldest media item in the rotation, an oldest media item in the rotation that is not tagged as non-removable, or an oldest media item in a subset of media images indicated as removable.

6. The media application of claim 1, wherein the sender may designate how each recipient will receive the shared media, including through one or more of: the media sharing and display application, a webpage accessible via a browser, and a social media network.

7. The media application of claim 1, wherein a media package is comprised of one or more of the following: photographs, videos, captions, frames, and metadata associated with each photograph or video.

8. The media application of claim 1, wherein the sending system sends the media package to a server, and the server sends the media package to the recipients.

9. The media application of claim 1, wherein the sender creates one or more "express lists" of recipients to enable the sharing of media to each "express list" with a single action.

10. The media application of claim 9, wherein the single action comprises one of:
    dragging or dropping photos or video clips into a specific icon or widget on their computer system or sending the media to a pre-identified email address associated with the express list.

11. The media application of claim 9, where each recipient in the express list receives the media using the sharing format originally identified by the sender.

12. A method of sharing media comprising:
    enabling a sender to select a plurality of media to be sent to a plurality of recipients, including at least one recipient using the media display application;
    packaging the plurality of media to be sent to the recipients;
    receiving the plurality of media;
    verifying that the sender is an authorized sender for the media display application, and accepting the media package when the sender is an authorized sender;
    unpacking the media package, and adding the plurality of media to a display interface, such that the plurality of media is added to a rotating display of media items in the display interface, the rotating display including media items from a plurality of senders.

13. The method of claim 12, wherein the plurality of media is automatically downloaded to the computer system at an appropriate resolution level for the device.

14. The method of claim 12, further comprising:
    determining whether a maximum number of media items are in the rotating display of media items, and if so, to remove a subset of the media items in the rotating display.

15. The method of claim 14, wherein the subset of the media items removed comprises one or more of: an age of the media item, a subject of the media item, a sender of the media item, or a least favorite media item.

16. The method of claim 15, wherein the age of the media item includes: an oldest media item in the rotation, an oldest media item in the rotation that is not tagged as non-removable, or an oldest media item in a subset of media images indicated as removable.

17. The method of claim 12, wherein the sender may designate how each recipient will receive the shared media, including through one or more of: the media sharing and display application, a webpage accessible via a browser, and a social media network.

18. The method of claim 12, wherein a media package is comprised of one or more of the following: photographs, videos, captions, frames, and metadata associated with each photograph or video.

19. The method of claim 12, further comprising:
    enabling the sender to create one or more "express lists" of recipients to enable the sharing media to each "express list" with a single action, wherein the single action comprises one of:
    dragging or dropping photos or video clips into a specific icon or widget on their computer system or sending the media to a pre-identified email address associated with the express list; and
    each recipient in the express list receives the media using the sharing format originally identified by the sender.

20. A method of displaying a plurality of media items in a media display application, the plurality of media items received from a plurality of senders, comprising:
    receiving a media package including one or more media from a sender;
    verifying that the sender is an authorized sender for the media display application, and accepting the media package when the sender is an authorized sender;

unpacking the media package, and adding the one or more media to the media display application;

displaying a slideshow including a rotating display of the plurality of media items in a display interface, the slideshow including a persistent frame shown on a desktop, wherein new media items are added to the slideshow transparently to the recipient when the media package is received from the authorized sender.

* * * * *